(12) United States Patent
Eisenzimmer et al.

(10) Patent No.: US 6,761,527 B2
(45) Date of Patent: Jul. 13, 2004

(54) METHOD AND APPARATUS FOR REMOVING TIRE TREADS FROM STORAGE DEVICE

(75) Inventors: George William Eisenzimmer, Uniontown, OH (US); Larry Wayne Burner, Ringgold, VA (US); Phillip Andrew Hynes, Danville, VA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/255,169

(22) Filed: Sep. 24, 2002

(65) Prior Publication Data

US 2003/0086780 A1 May 8, 2003

Related U.S. Application Data

(62) Division of application No. 09/341,820, filed as application No. PCT/US97/00455 on Jan. 17, 1997, now Pat. No. 6,461,100.

(51) Int. Cl.[7] .................................................. B25J 5/02
(52) U.S. Cl. ........................ 414/758; 294/65; 414/728; 414/736; 414/737; 414/783
(58) Field of Search .................. 294/64.1, 65; 414/728, 414/736, 737, 758, 773, 783

(56) References Cited

U.S. PATENT DOCUMENTS

| | | | |
|---|---|---|---|
| 3,866,774 A | 2/1975 | Ims | |
| 3,901,392 A | 8/1975 | Streckert | |
| 4,062,458 A | 12/1977 | Manini et al. | |
| 4,141,457 A | * 2/1979 | Nocek | 414/737 |
| 4,822,236 A | 4/1989 | Inoue et al. | |
| 4,892,453 A | * 1/1990 | Bantien et al. | 414/749 X |
| 5,387,068 A | 2/1995 | Pearson | |
| 6,042,101 A | 3/2000 | Menard et al. | |
| 6,217,093 B1 | 4/2001 | Neutel et al. | |

FOREIGN PATENT DOCUMENTS

| JP | 58216831 | 12/1983 |
|---|---|---|
| JP | 59224329 | 12/1984 |
| JP | 3067816 | 3/1991 |

* cited by examiner

Primary Examiner—Janice L. Krizek
(74) Attorney, Agent, or Firm—Brouse McDowell; Roger D. Emerson

(57) ABSTRACT

An apparatus and method for removing an unvulcanized tire tread from a storage device (14) includes the step of inverting the tread (12) and transporting it to a roller conveyor in a single step. The tread (12) is picked up by a vacuum bar (80) fitted with a series of suction cups (76). Individual suction cups (76) can be selectively supplied with vacuum depending on the length of the tread (12). After the suction cups (76) have engaged the tread, the tread is raised from the storage device (14), inverted through 180 degrees, and then set onto a special slotted roller conveyor (130). The slotted roller conveyor (130) has a center slot (142) to receive the vacuum bar (80) as it passes therethrough. Side slots (144, 146) in the conveyor receive arms (90,92) attached to the vacuum bar (80).

7 Claims, 10 Drawing Sheets

US 6,761,527 B2

METHOD AND APPARATUS FOR REMOVING TIRE TREADS FROM STORAGE DEVICE

TECHNICAL FIELD

This application is a divisional of application Ser. No. 09/341,820 filed Jul. 19, 1999, now U.S. Pat. No. 6,461,100, which claims the benefit of PCT/US97/00455 filed Jan. 17, 1997.

This invention pertains to the art of methods and apparatuses for storage of unvulcanized tire treads, sidewalls, and other tire components, and more specifically to an improved method and apparatus to remove an unvulcanized tread from a storage device.

BACKGROUND ART

It is known in the art to store unvulcanized tire treads in storage devices commonly known as "bear traps" which have a series of planar elements upon which the treads are stored. Previously, treads removed from such storage devices were removed manually by a human tire builder.

Depending on the size of the tire tread, the task of removing the tread from the storage device could be one of the most distasteful and uncomfortable in the entire tire building process. For example, for truck tires and for aircraft tires, the associated treads in their unvulcanized state can approach one hundred pounds in weight and can be up to twelve feet long. In addition, the treads are "booked" or stored upside down so that a sticky, tacky layer of rubber is upward. Manually manipulation of the tire treads is physically taxing for the tire builder. In addition, certain non-uniformities and undesirable qualities could be imparted to the tire tread, and eventually to the tire, through manual handling of the unvulcanized tread.

The present invention contemplates a new and improved method and apparatus for removing unvulcanized tire treads from the storage devices. The method and apparatus is simple in design, effective in use, and overcomes the foregoing difficulties in others while providing better and advantageous overall results.

DISCLOSURE OF INVENTION

In accordance with the present invention, a new and improved method and apparatus for removing unvulcanized tire treads from a storage device is provided.

More particularly in accordance with the invention, the apparatus includes a frame, an arm movably mounted on the frame, the arm having a horizontal axis, a first translation means for translating the arm along the vertical axis of the frame, a gripping means for gripping the associated tire tread, a second horizontal translation means for translating the gripping means along the horizontal axis of the arm.

According to another aspect of the invention, the apparatus includes a frame with a vertical axis and an arm assembly movably mounted on the frame. The arm assembly has a horizontal axis, a vertical moving means for moving the arm assembly along the vertical axis, a first horizontal moving means for moving the arm assembly along the horizontal axis, a gripping means for gripping the associated tire tread, translation means for translating the gripping means about the horizontal axis, and a second horizontal moving means for moving the gripping means horizontally along the horizontal axis.

One advantage of the present invention is the provision of a new apparatus which can effectively remove tire treads from a storage device, and invert the treads, and place them on an appropriate conveyor for further processing.

Another advantage of the present invention is the fact that such removal includes the step of inverting, thereby in a single step removing the tread from the storage device and inverting it for application to the tire.

Another advantage of the present invention is the labor savings, increase in job satisfaction, and the easing of strain on the tire builders body by automating the difficult task of lifting and positioning an unvulcanized tire tread.

Another advantage of the invention is that the above-recited advantages are accomplished by an apparatus with relatively few moving parts.

Still other benefits and advantages of the invention will become apparent to those skilled in the art to which it pertains upon a reading and understanding of the following detailed specification.

BRIEF DESCRIPTION OF DRAWINGS

The invention may take physical form in certain parts and arrangement of parts, a preferred embodiment of which will be described in detail in this specification and illustrated in the accompanying drawings which form a part hereof and wherein:

FIG. 3A is a partial front view of an arm assembly in a topmost position before the tread is inverted.

FIG. 3B is a partial front view of the arm assembly in a topmost position after the tread is inverted.

DETAILED DESCRIPTION OF THE INVENTION

Figure 1:
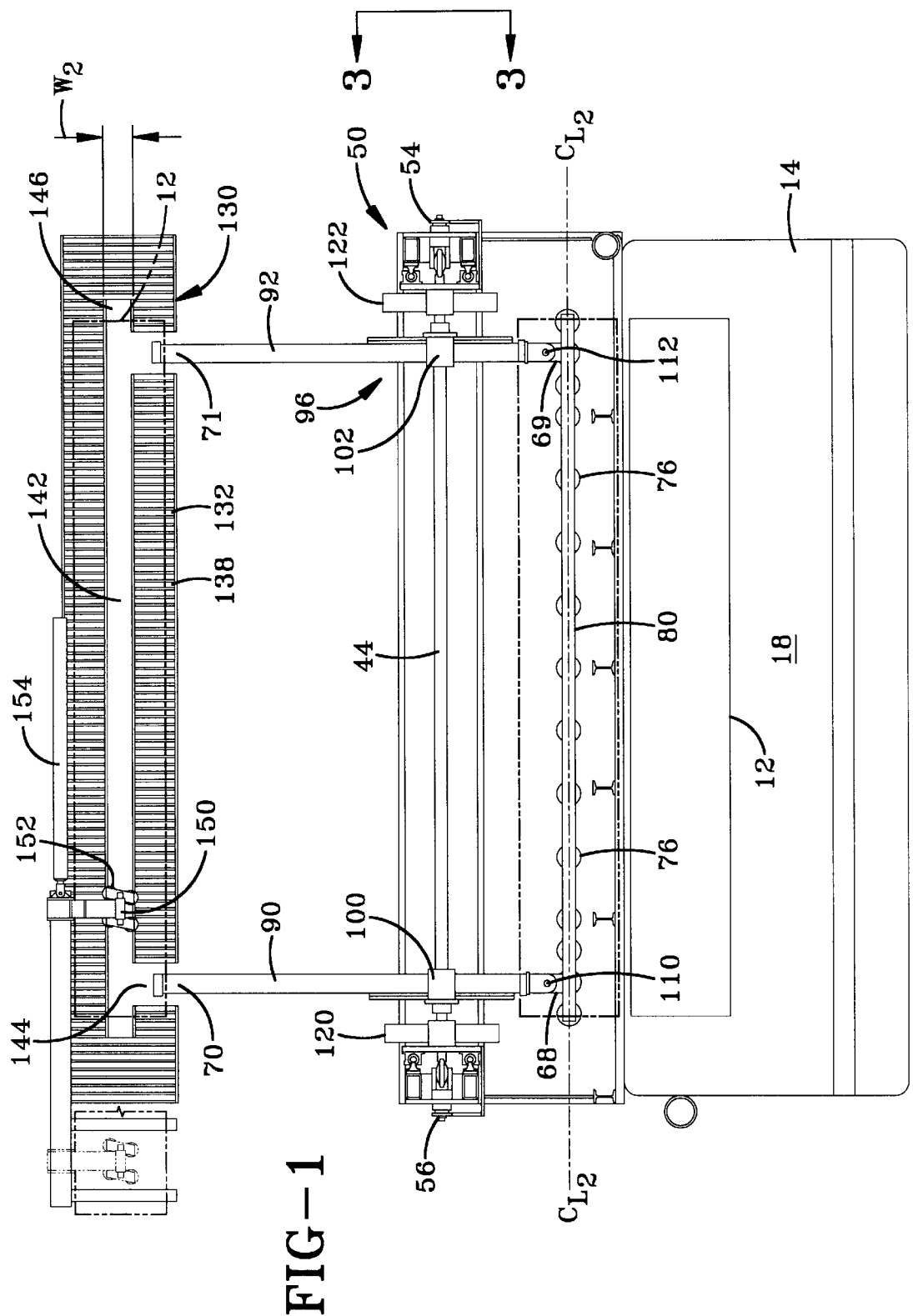
FIG. 1 is a top view of a tread debooking system including a lifting apparatus and conveying apparatus according to the invention.
Figure 2:
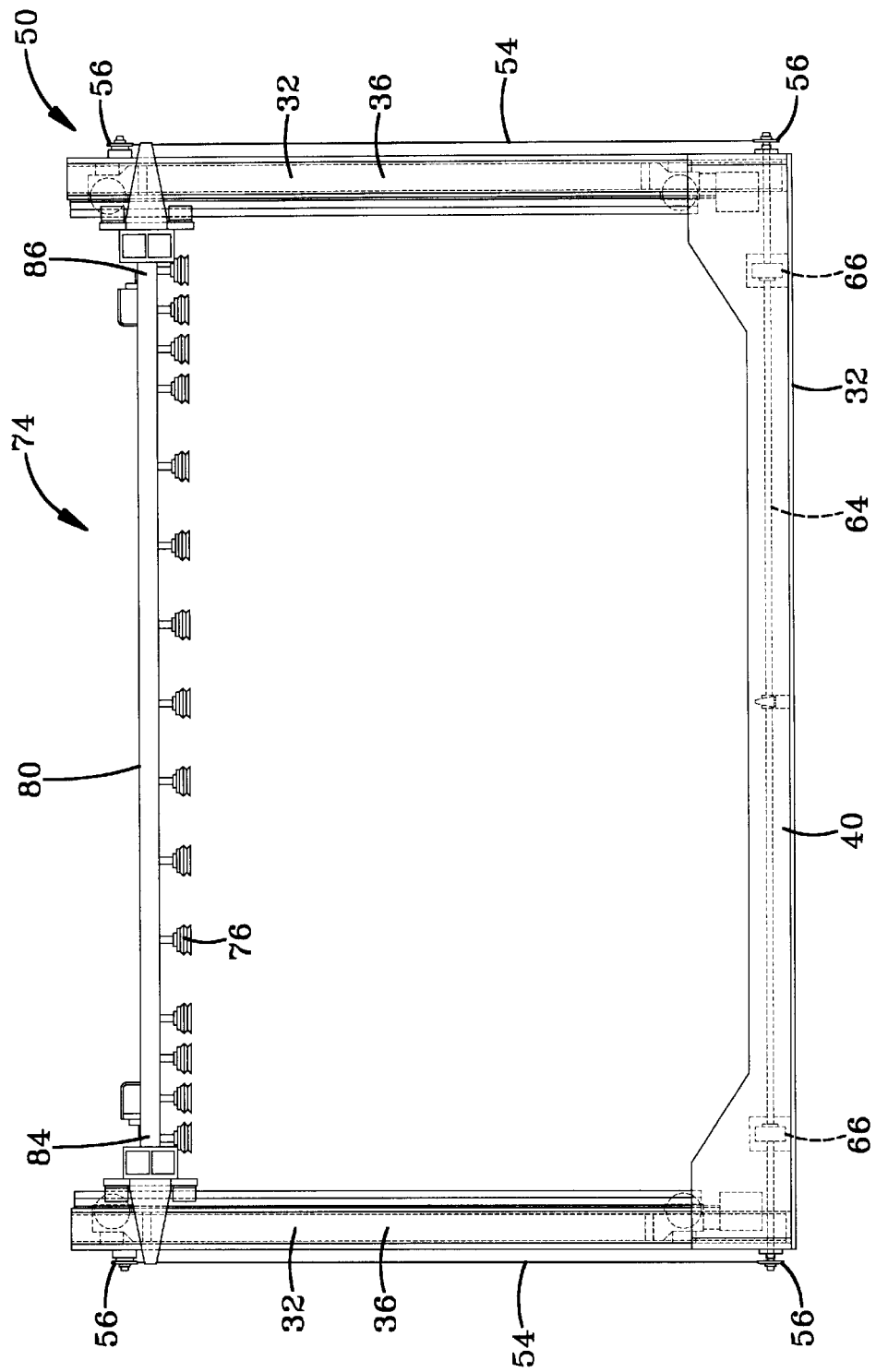
FIG. 2 is a front view of the lifting apparatus according to the invention.
Figure 3:
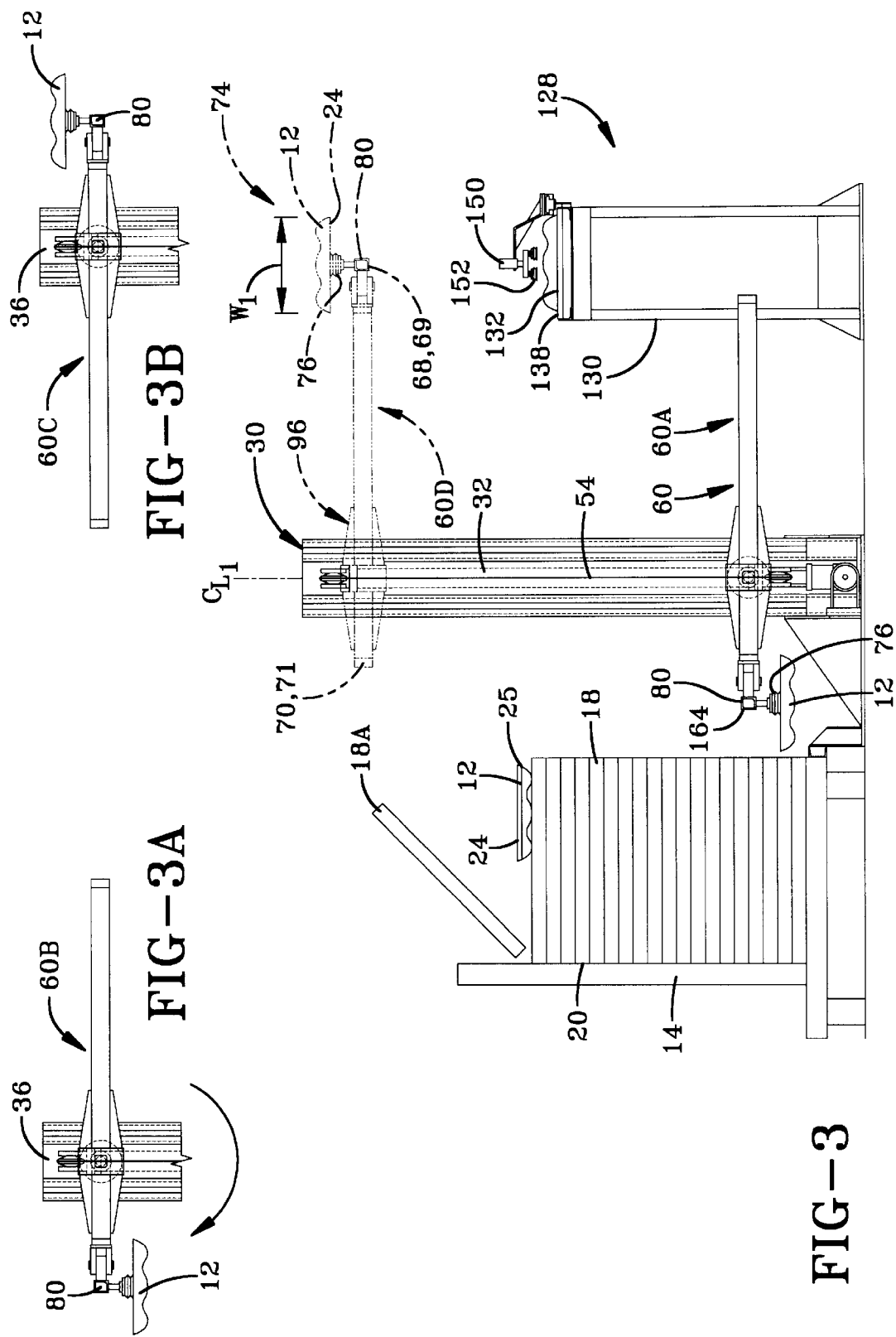
FIG. 3 is a side view from perspective 3—3 of FIG. 1.
Figure 4:
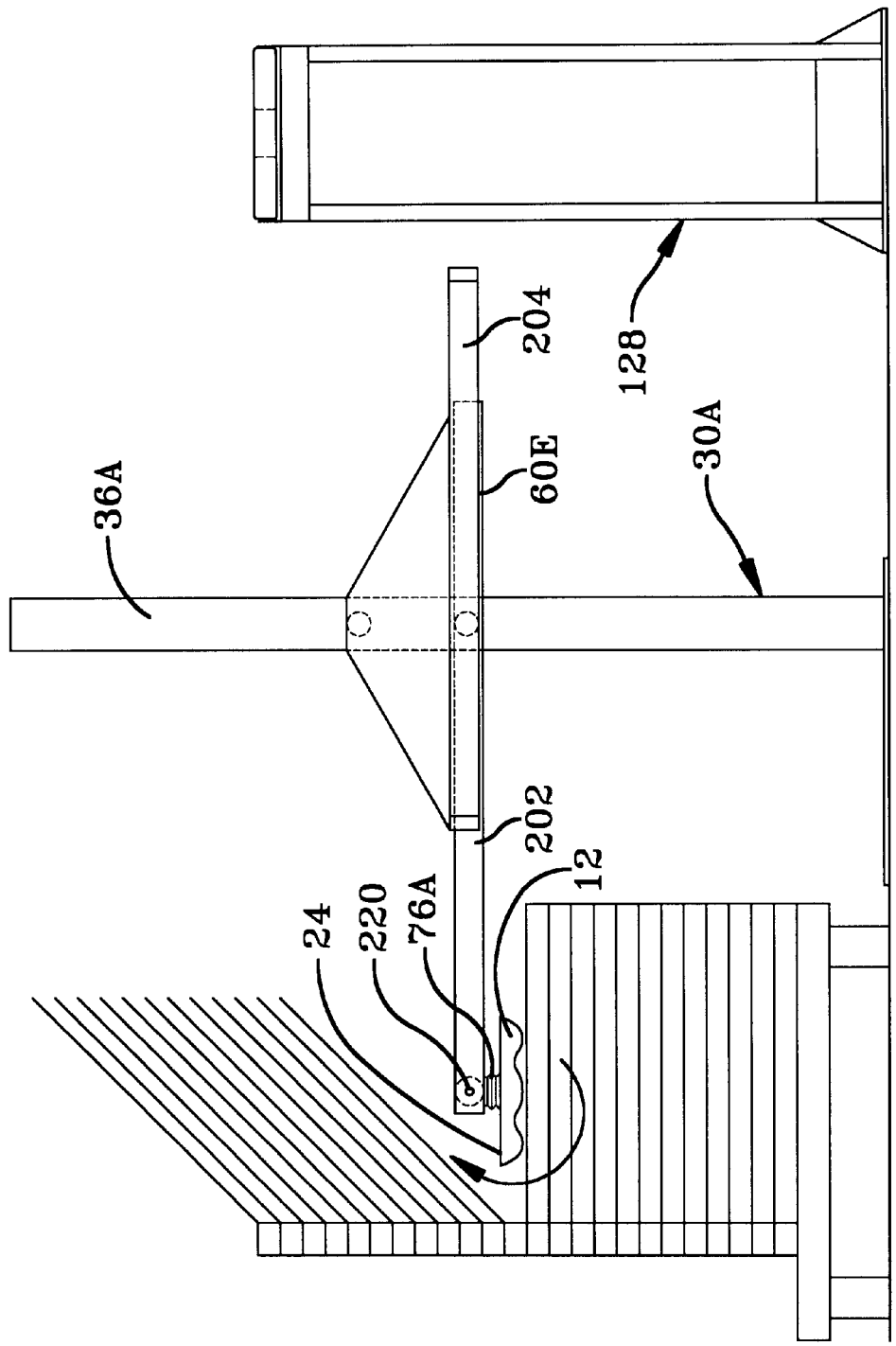
FIG. 4 is a front view of a second embodiment of the tread debooking system according to the invention.

Referring now to the drawings wherein the showings are for purposes of illustrating a preferred embodiment of the invention only and not for purposes of limiting the same, FIGS. 1–3 illustrates a preferred embodiment of a tread debooking system according to the invention. The invention is directed to the problem of removing and inverting an associated, unvulcanized tire tread 12 from an associated tread storage device 14. The storage device 14 illustrated is commonly known in the tire industry as a "bear trap." It comprises a series of planar steel sheets 18 which are hinged at one end 20 so that they can be flipped upwardly and out of the way when the tread 12 is removed, as is illustrated by a tray 18A. Unvulcanized treads 12 are stored in the storage device 14 on the trays 18. As the associated treads 12 are removed by the inventive apparatus, the trays 18 can be pushed upwardly to the position illustrated by tray 18A. At the present time, this process is manual, i.e., the human tire builder pushes the trays 18 upwardly, but in the preferred and foreseen embodiment this process is automated in at a future date in conjunction with the invention described herein.

The associated treads 12 are stored in an inverted position on the trays 18 so that the ground-contacting portion of the tread is resting on the upper surface of the tray 18, as is illustrated in FIG. 1, and the underside 24 of the tread is exposed. This is primarily due to the tacky layer of cushion gum 25 which is affixed to the underside 24 of a tread. The cushion gum 25 is a relatively tacky unvulcanized rubber. The cushion gum 25 performs the important function of helping to adhere the tread 12 to the unvulcanized carcass (not shown) of the tire (not shown) during a separate step in the tire-building process. If the tread 12 were to be stored on the tray 18 in the storage device 14 with underside 24 resting on the upper surface of the tray 18, the cushion gum 25 would tend to cause the tread 12 to stick to the tray 18. In addition to the undesirable difficulties this presents in the manufacturing process, tire uniformity would also be detrimentally affected. Therefore, one of the steps in supplying the tread to the tire building machine is the inversion step where the inverted tire tread 12 is turned 180° so the cushion gum side of the tread 12 is oriented downwardly.

The inverting of the tire tread 12 is accomplished by lifting apparatus 30. The lifting apparatus 30 includes a frame 32 generally comprised of two stationary upright members 36 joined at one end by a floor member 40, best shown in FIG. 2, although the invention works equally well with free-standing upright members 36. The frame 32 must be strong enough to withstand the static and dynamic loads placed upon it by the manipulation of the treads 12. In the preferred embodiment, upright members 36 and floor member 40 are made of steel. The calculation of the size and strength required for the upright members 36 and floor member 40 is a typical calculation using sound engineering principles and depends on the weight of the tire component involved. However, these materials and dimensions may vary from application to application and materials and dimensioning should be made with regard to common engineering judgment.

The lifting apparatus 30 also includes an arm assembly 60. In a preferred embodiment, arm assembly 60 includes first arm 90 and second arm 92 which are spaced from each other along a rod 44 which extends between upright members 36. Rod 44 is rotatable about its axis as will be discussed in further detail later in this disclosure. The rod 44 is preferably made of steel and has a diameter adequate to handle the torque required.

A first translation means 50 provides vertical movement for arm assembly 60. The first translation means 50 includes pneumatic cylinders and one or more chain drives 54. In the preferred embodiment, each chain drive 54 is a double chain drive, as is illustrated best in FIG. 2. Each of the chain drives 54 operates between a pair of sprockets 56. Parallel to floor member 40 is an axle 64 which is driven by pneumatic cylinders mounted within the upright members 36. The chain drives 54 keep the machine in alignment, as the movement of the axle 64 via the air cylinders may not provide the requisite precision. The axle 64 is supported by bearings 66. Couplings can also be used instead of bearings, if desired. The first translation means 50 operates to lift or lower arm assembly 60 along the vertical axes of the upright members 36.

The lifting apparatus 30 further includes gripping means 74 for securely gripping tread 12. Gripping means 74 preferably comprises a series of suction cups 76 operatively associated with a vacuum bar 80. The vacuum bar 80 is mounted at the first ends 68,69 of arms 90,92 respectfully, of the arm assembly 60 and is operatively connected to a source of vacuum (not shown). The preferred suction cup 76 is about four and one half inches (4.5 inches) in diameter and has a bellows with a relatively large volume. The preferred arrangement of suction cups is illustrated in FIG. 2. Note that at the first and second ends 84,86 of vacuum bar 80 the spacing between the individual suction cups 76 narrows. The purpose of the narrowing spacing is two-fold. First, it enables a secure grip to be had on the end of the associated tread 12. Second, because the length of the tread 12 may vary, it enables any suction cups 76 which would extend beyond the end of the tread 12 to be shut off from vacuum. Each of the suction cups 76 is provided with a shut off valve so that vacuum can be supplied only to those suction cups 76 which are actually to come in contact with the tread 12. The suction cups 76 are a preferred interfacing means for interfacing between the vacuum bar 80 and the associated tread 12. However, other devices could be used to accomplish many of the objectives of this invention. The suction cups 76 do not damage the cushion gum 25 on the underside 24 of the tread 12. In the preferred embodiment, a single row of suction cups 76 is utilized although, depending on the size of the suction cups 76, amount of vacuum pulled and the size of the tread 12 involved, different configurations of suction cups 76 might be preferred. For example, the suction cups 76 could be staggered or be placed asymmetrically or nonuniformly.

The first and second arms 90,92 of arm assembly 60 are essentially pneumatic, hydraulic, or electrically actuated cylinders which can extend outwardly or retract inwardly relative to the vertical axes of upright members 36, shown as CL1 in FIG. 3. The first arm 90 is operable separately from the second arm 92 in the event that the tread 12 is misaligned on tray 18 in the storage device 14. In that event, the first arm 90 can be extended a distance either greater or less than the second arm 92 so that the centerline CL2 of the vacuum bar 80 may be aligned with the centerline of the tread 12. Joints 110, 112 are provided at the interface between the vacuum bar 80 and arms 90,92 which allow the vacuum bar 80 to swivel. A second translation means 96 which allows the extension or retraction of arms 90,92 comprises linear bearings 100,102 through which the first and second arms 90,92 slide, respectively.

First rotation means for rotating the arm assembly 60 includes at least one, and preferably two, hydraulic actuators 120,122 located at the ends of rod 44. Actuators 120,122 cause rod 44 to be rotated about its axis. As rod 44 rotates, the arms 90,92 revolve around the axis of rod 44 as shown the arrow in FIG. 3A and thereby invert the vacuum bar 80 and the associated tread 12. The rotation of rod 44 occurs after the tread 12 is gripped by gripping means 74 and the arms 90,92 are retracted toward the upright members 36 in order for the tread 12 to clear the trays 18.

In a preferred embodiment, the arm assembly 60 is vertically translated to a topmost position, illustrated as 60B in FIG. 3A, before rod 44 is rotated. It is readily apparent then that during lifting of the tread 12 from trays 18, vacuum bar 80 is above tread 12. After rod 44 is rotated, vacuum bar 80 is positioned beneath tread 12 as illustrated as 60C in FIG. 3B. The arms 90, 92 are then extended away from upright members 36 and the arm assembly 60 is positioned as illustrated by 60D in FIG. 3.

A related element in the system is a conveying apparatus 128. As is best illustrated in FIG. 1, conveying apparatus 128 includes a slotted conveyor 130. The upper surface 132 of the slotted conveyor 130 comprises a plurality of rollers 138, such as are known in the art. Each roller 138 is supported by a ball bearing (not shown) at either end. An important advantage of the present invention is the capability of inverting the tread 12 and placing it onto the slotted conveyor 130 with its underside 24 down. The structure of the slotted conveyor 130 enables the lifting apparatus 30 to accomplish this desirable event by the provisions of center slot 142 and side slots 144,146. From the position illustrated as 60D, arm assembly 60 vertically translates downwardly toward the conveyor 130. The first ends 68,69 of the arms 90,92 pass through the side slots 144,146 and vacuum bar 80 passes through the center slot 142 as the arm assembly 60 is lowered below the upper surface 132 of the slotted conveyor 130. However, tread 12 is prevented from passing through the center slot 142 because the width W1 of the tread 12 is wider than the width W2 of the center slot 142. In that way, the outer edges of the tread 12 rest upon the rollers 138 and the tread 12 is suspended upon the upper surface 132 of the slotted conveyor 130 while the first ends 68,69 of the arms 90,92 pass downwardly through the side slots 144,146 and the vacuum bar 80 passes downwardly through the center slot 142. The vacuum is turned off as the arms 90,92 pass through the slotted conveyor.

When the vacuum bar 80 is positioned above a tread 12, as shown in FIG. 1, the second ends 70,71 of the arms 90,92 may also pass through the side slots 144,146. After the tread 12 is placed on the slotted conveyor 130, an associated advancing means 150 advances the tread 12 forward via tread advance cylinder 154. The translation device 150 progresses the tread 12, in its proper orientation with the underside 24 down, through the building machine for inclusion into the tire itself.

With the apparatus described as above, the inventive method of removing a tread from a storage device will now be described with reference to an operator who manually operates a joy stick to control some of the movements of the inventive apparatus. However, it is within the scope of the present invention to incorporate a fully automated system. The unvulcanized treads 12 are placed on the trays 18 of the "bear trap style" storage device 14. In the present embodiment, the treads 12 are placed manually but it is foreseen that the treads will be automatically placed in the near future. Presently, two treads 12 are placed side by side and parallel on each tray 18 although the invention will work with alternate configurations of tread. An electric eye 164 mounted on the front side of each of the arms 90,92 can sense the edge of the top most tray 18. From a home position, the human operator of the inventive apparatus and method has manual control of the arms 90,92. The operator pushes a joy stick on a control panel (not shown) to the "cylinder forward" position. The arms 90,92 are extended until vacuum bar 80 is positioned over tread 12. Sensors 164 located on the front side of each of the arms 90,92 sense the location of the tread, thereby stopping each arm 90,92 independently of the other. The operator now moves the joy stick (not shown) to a control position called "down" and the arm assembly 60 moves downward until all suction cups 76 have engaged the underside 24 of the tread 12. At this point, the operator releases the joy stick. Upon release of the joy stick, the vacuum in each individual suction cup 76 is drawn. As mentioned previously, suction cups 76 extending beyond the limits of the tread 12 should be shut off to save vacuum. A pressure release cylinder is installed so the operator can not inadvertently apply too much pressure downwardly on top of the tread 12 through the vacuum bar 80 and suction cups 76. In the preferred embodiment, each suction cup 76 has an individual vacuum source. The vacuum supplied to each individual suction cup 76 is activated when the cup 76 in question touches the underside 24 of the tread 12. The operator now moves the joy stick to the "up" position. Again, a pressure release regulator is installed so that the operator can not inadvertently apply too much pressure in the upward direction. Once the tread 12 is vertically free from the tray 18, the operator moves the joy stick to an "in" position to retract arms 90,92 while the gripping means 74 engages the tread 12. The arm assembly 60 returns to a "home position" in which the vacuum bar 80 is near the upright members 36 of frame 32. This position is illustrated as 60A in FIG. 1.

The arm assembly 60 moves vertically upward along frame 32 in response to chain drive 54. When the arm assembly 60 reaches the topmost position, as illustrated as 60B in FIG. 3A, sensors (not shown) make contact and signal actuators 120, 122 to rotate rod 44. These actuators 120,122 rotate the rod 44 causing arm assembly 60 and vacuum bar 80 to revolve about the axis of rod 44 approximately 180 degrees in the direction illustrated the arrow shown in FIG. 3A. Note that during this process, the tread 12 is inverted so that the underside 24 is down. A further embodiment of the present invention would allow rod 44 to be rotated simultaneously with the vertical translation of arm assembly 60 as long as clearance from trays 18 is achieved.

With the tread 12 now positioned above vacuum bar 80, as shown in FIG. 3B, the arms 90,92 extend to the full stroke of the cylinder to the position illustrated as 60D in FIG. 3. The arm assembly 60 moves vertically downward toward the slotted conveyor 130. The arms 90,92 pass through the side slots 140,146 while the vacuum bar 80 passes through the center slot 142. In the process, the tread 12 contacts the upper surface 132 of the slotted conveyor 130 and is retained thereon. As the tread 12 is lowered, the vacuum ceases, enabling the tread 12 to be easily disengaged from the suction cups 76.

The tread 12 is now advanced by advancing means 150 toward the tire building machine (not shown) and the arm assembly 60 is repositioned to lift and invert another tread 12. Generally, arms 90,92 retract toward upright members 36, arm assembly 60 is returned to the topmost position, and rod 44 is again rotated.

One method of advancing the tread 12 incorporates a tread advance cylinder 154 to move suction cups 152 over the tread 12. The suction cups 152 are provided with vacuum at this point so that they can grip the tread 12 and move it forward. A pressure sensor will indicate when vacuum has been made, thereby causing the cylinders 154 to lift the end of the tread 12. When the lift is made, tread advance cylinder 154 will make a full stroke forward, thereby moving the tread 12 over power rolls (not shown). Other advancing means such as powered rollers may be employed.

With reference to FIGS. 4–10, a second embodiment of the invention will be described. This embodiment may be preferred in some applications, such as when there is a shortage of headroom in the manufacturing facility. One primary advantage of the second embodiment is that less overhead room is needed to operate the lifting apparatus 30A because the arm assembly 60D does not swing around the axis of rod 44.

For ease of illustration and for brevity, the like components of the second embodiment shown in FIGS. 4–10 will not be again described, as their operation is the same as in the first embodiment illustrated in FIGS. 1–3. Instead, the differences between the embodiments will be more thoroughly described.

Figure 8:
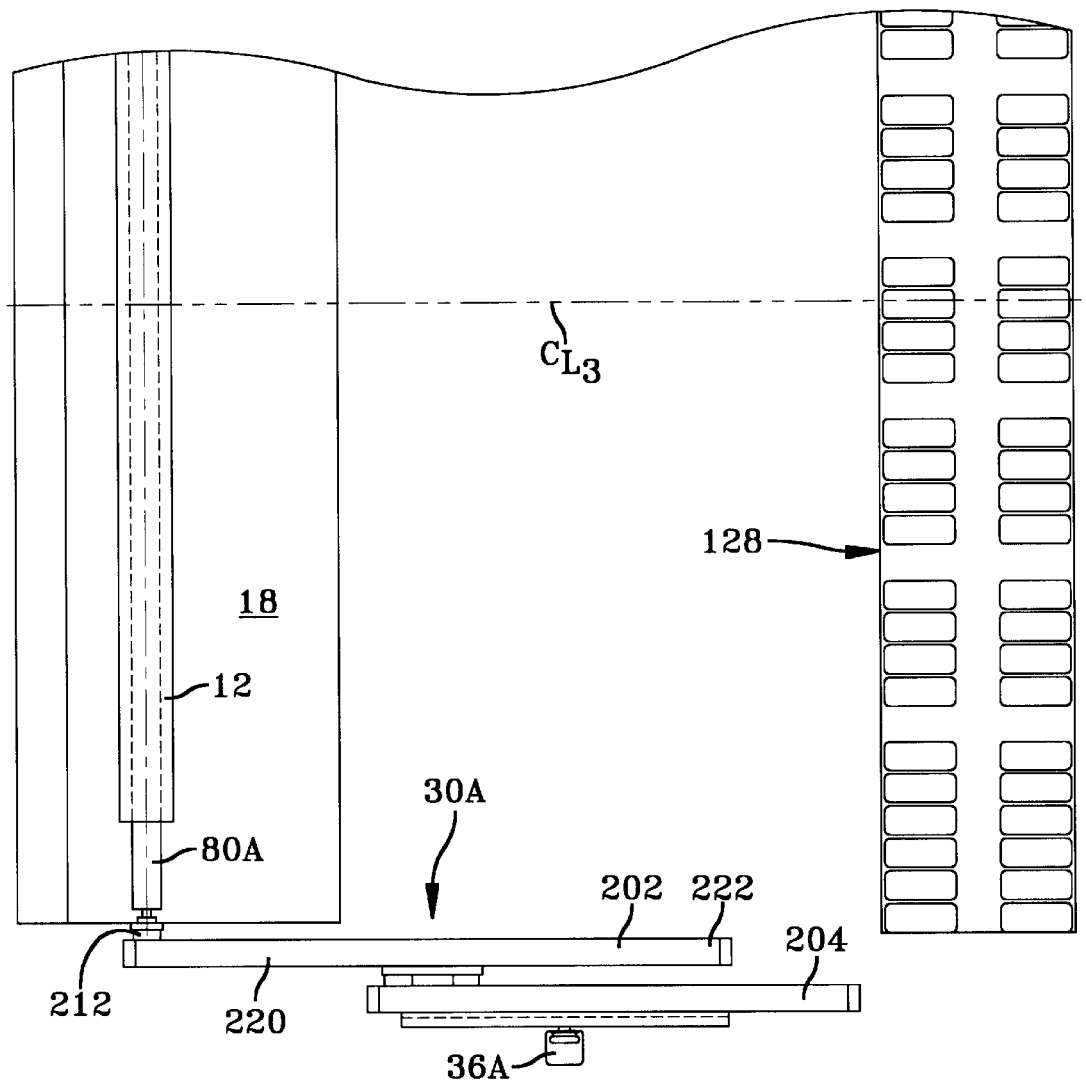
FIG. 8 is a half top view of the second embodiment of the invention.
Figure 9:
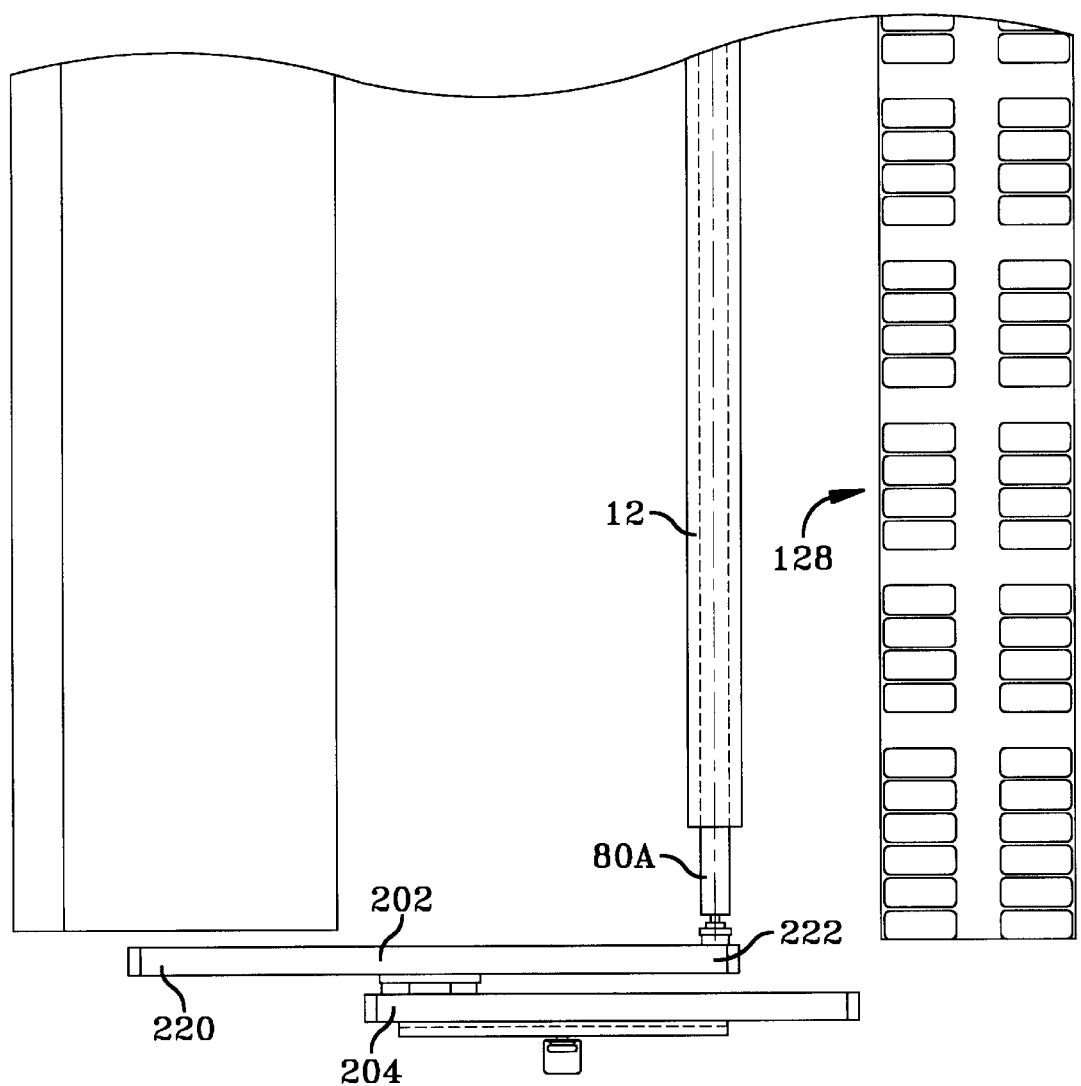
FIG. 9 is a half top view of the second embodiment showing the lifting apparatus in the position shown in FIG. 6.
Figure 10:
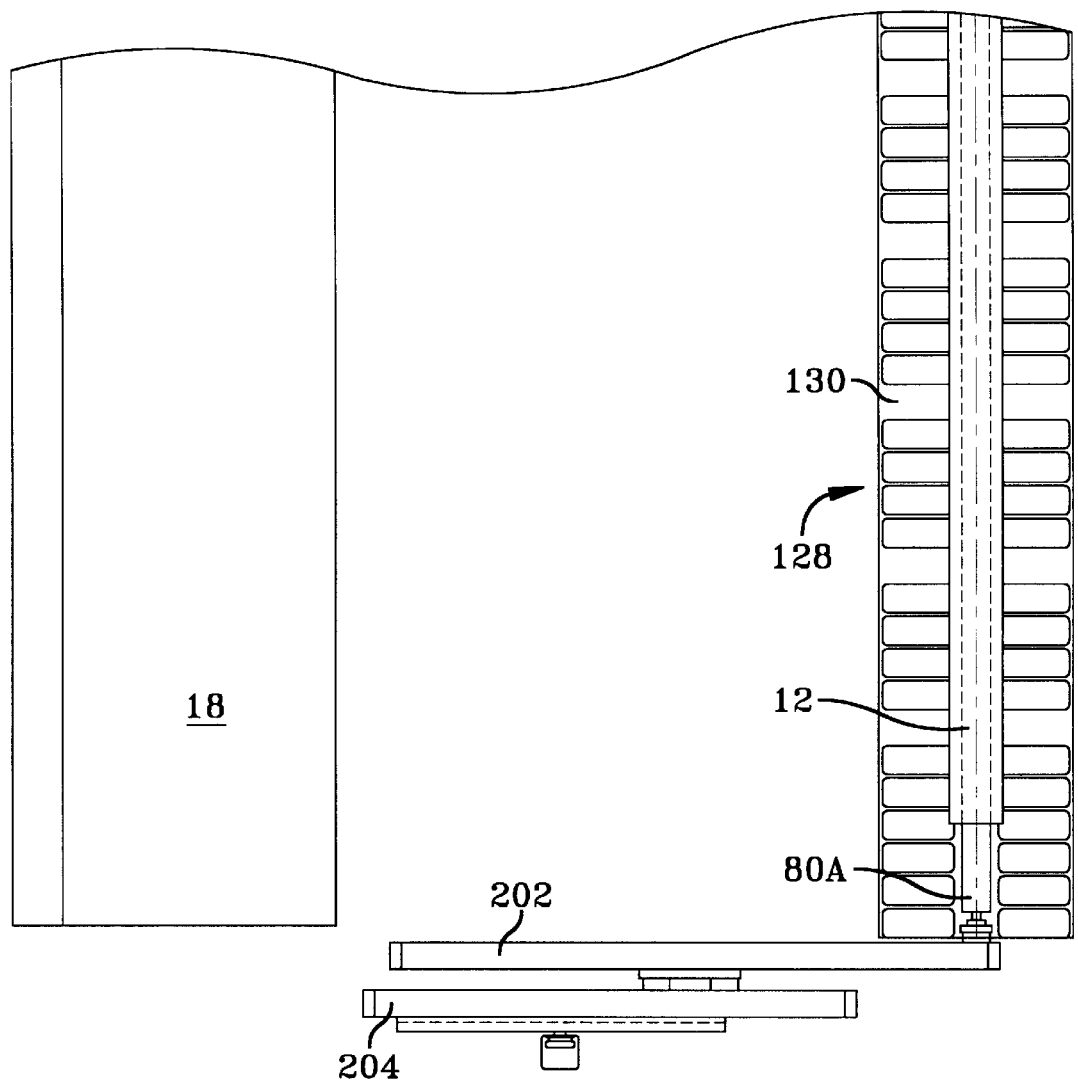
FIG. 10 is a half top view of the second embodiment showing the lifting apparatus in the position shown in FIG. 7.

The primary difference between the first and second embodiments of the invention concerns the use of twin linear cylinders, first cylinder 202 and second cylinder 204, attached to each of the upright members 36A of the lifting apparatus 30A. FIGS. 8–10 show only one upright member 36A and its associated first and second cylinders 202, 204. However, the lifting apparatus 30A is generally symmetric about centerline CL3 and comprises a second upright member 36A (not shown) and its associated first and second cylinders 202, 204 (not shown). The presently preferred linear cylinders 202,204 are available from Parker Hannifin and sold under the trade name Parker Series RC. The preferred type linear cylinder is a rodless air cylinder.

Another important difference between the second embodiment and the first includes the provision of at least one, and preferably two, rotary actuators 212 which are operably connected to the ends of vacuum rod 80A. This rotary actuator is commercially available from a variety of sources and inverts the tread 12 soon after it is lifted from the tray 18.

The operation of the second embodiment of the invention will now be described. As before, the operation will be described with reference to a human operator, although a fully automated system is within the scope of the present invention. Unvulcanized treads 12 are placed on the trays 18 of the storage device 14. The human operator of the second embodiment of the lifting apparatus 30A manipulates a joy stick on a control panel (not shown) to a "cylinder forward" position. Cylinders 202 extend outward from upright members 36A until the vacuum bar 80A and associated suction cups 76A are positioned over the tread 12. The operator now moves the joy stick to the control position called "down" until all suction cups 76A have engaged the underside 24 of the tread 12. At this point, vertical translation means, such as chain drives previously described (not shown), are employed to lift the arm assembly 60E so that the tread 12 clears the tray 18. In addition, cylinders 202 may be retracted to insure clearance of the tread 12 from tray 18. Rotary actuator 212 is activated and vacuum bar 80A is rotated in the direction represented by the arrow in FIG. 4 approximately 180 degrees. The vacuum bar 80A is selectively positioned at the first ends 220 of cylinders 202 when the tread 12 is engaged and inverted.

Figure 5:
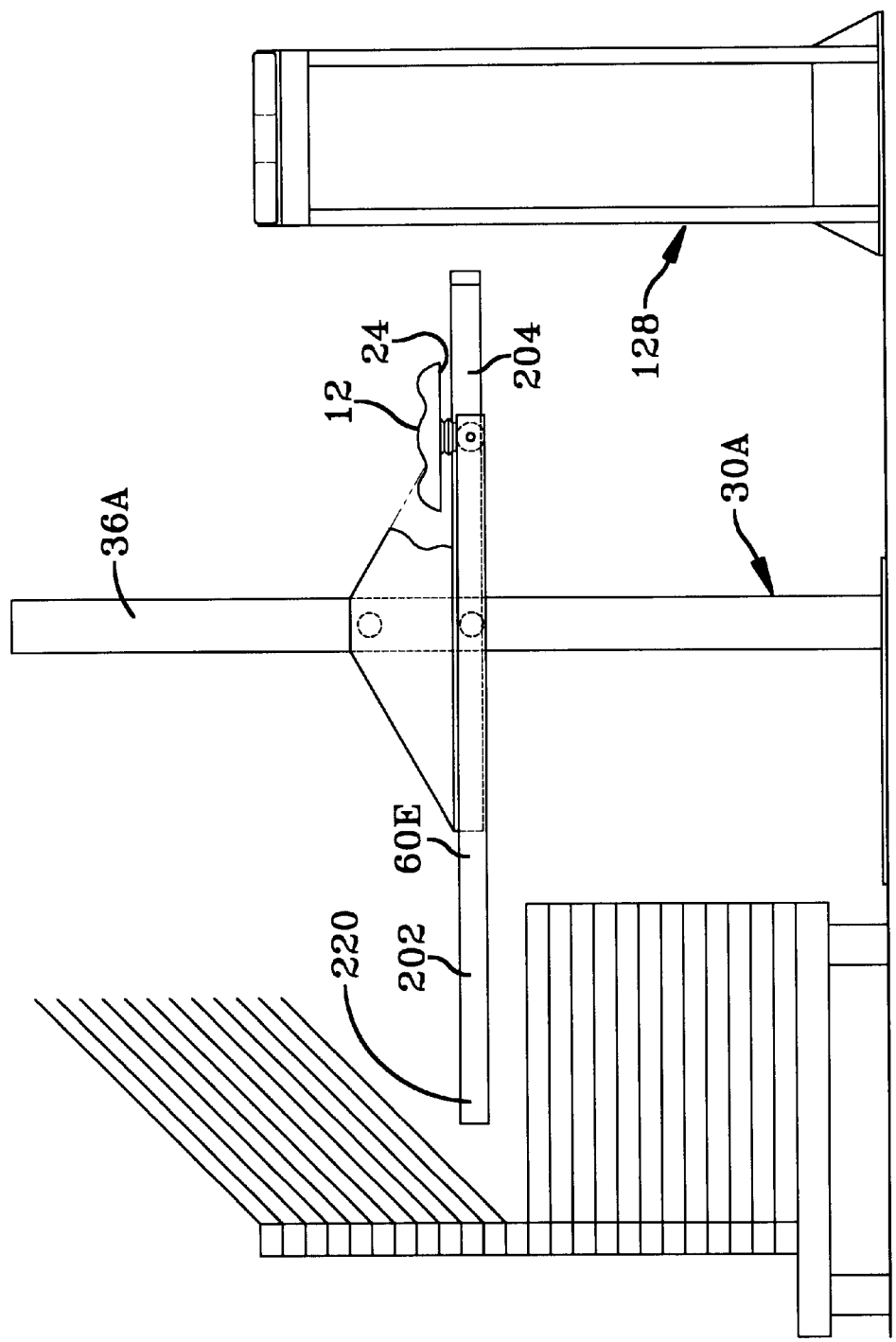
FIG. 5 is an additional front view of the second embodiment of the invention illustrated in FIG. 4 wherein the lifting apparatus is in a different position.
Figure 6:
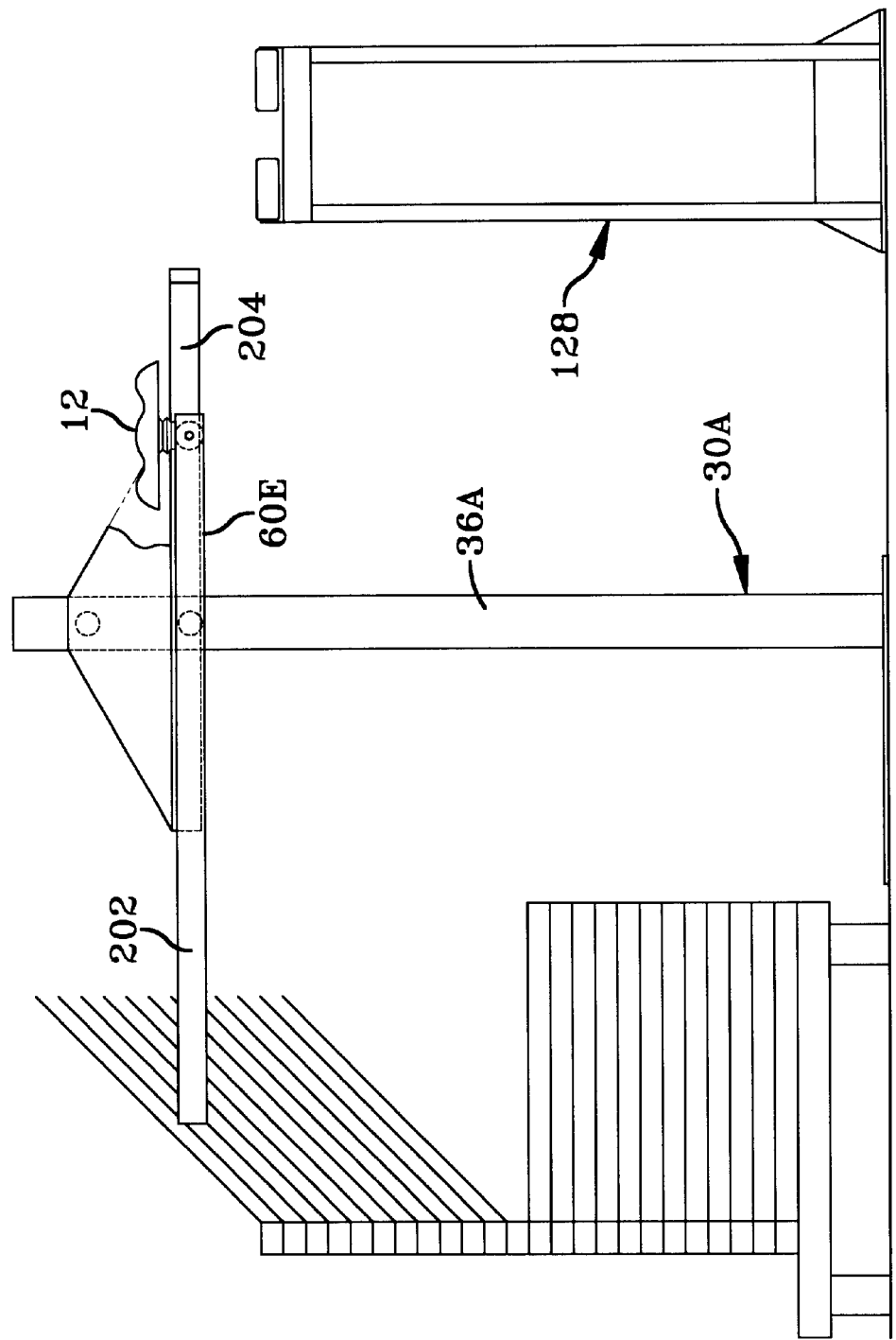
FIG. 6 is another front view of the second embodiment of the invention wherein the lifting apparatus is in yet another position.

With reference to FIGS. 8 and 9, the vacuum bar 80A holding the tread 12 is moveable along cylinder 202 to be selectively positioned at the second ends 222 of cylinders 202. With particular reference to FIG. 10, cylinders 202 are further moveable along the lengths of cylinders 204. Therefore tread 12 may be translated from tray 18 toward the slotted conveyor 130 by moving vacuum bar 80A from first ends 220 to second ends 222 of cylinders 202 and by moving cylinders 202 with respect to cylinders 204. The operator of the lifting apparatus 30A manipulates the joy stick on the control panel to a "cylinder backward" position to move cylinders. 202 toward slotted conveyor 130. As is readily apparent, the vacuum bar 80A must be vertically positioned above the slotted conveyor 130 before it can unload the tread 12. As illustrated in FIGS. 5 and 6, vertical lifting of the arm assembly 60E may be accomplished at any point after the vacuum bar 80A and tread 12 have cleared tray 18.

Figure 7:
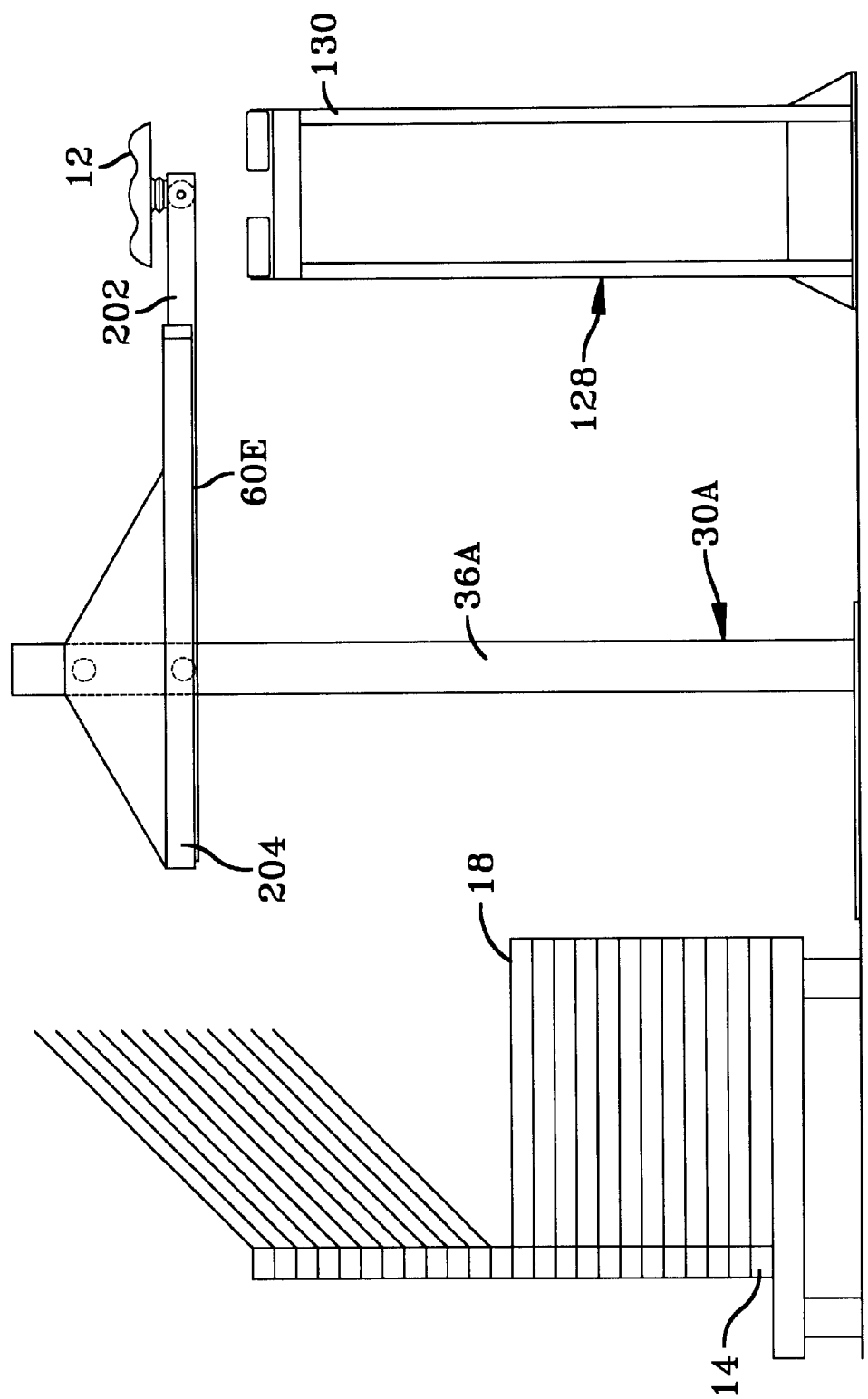
FIG. 7 is another front view of the second embodiment of the invention wherein the lifting apparatus is shown in yet another position.

As illustrated by FIGS. 7 and 10, once the vacuum bar 80A and tread 12 are positioned above the slotted conveyor 130, the arm assembly 60E is lowered by the vertical translation means. Cylinders 202 and vacuum bar 80A pass through slots as previously described, and tread 12 is retained on slotted conveyor 130. As with the first embodiment, the suction cups 76A are then released from the tread 12, and the tread 12 is advanced toward a tire building machine.

The invention has been described with reference to preferred embodiment. Obviously, modifications and alterations will occur to others upon a reading and understanding of this specification. It is intended to include all such modifications and alternations in so far as they come within the scope of the appended claims or the equivalents thereof.

Having thus described the invention, it is now claimed:

1. A system for removing an associated tire tread from an associated storage device, the system characterized by:
    a lifting apparatus comprising gripping means for gripping the associated tread and inverting means for inverting said gripping means; and,
    a conveying apparatus having an upper surface for supporting the associated tread, said upper surface having a first slot therein for passage of said gripping means from a position above said upper surface to a position below said upper surface, said first slot having a width narrower than a width of the associated tread,
    wherein said lifting apparatus further comprises:
        a frame including first and second spaced vertical members and having a vertical axis;
        an arm assembly mounted on said frame and supporting said gripping means, said arm assembly generally defining a first plane; and,
        a first translating means for vertically translating said arm assembly along said vertical axis of said frame.

2. The system of claim 1 wherein said inverting means includes a rotary actuator mounted on said arm assembly, said rotary actuator being operable to rotate said gripping means about an axis thereof.

3. The apparatus of claim 1 wherein said gripping means comprises:
    a vacuum bar having spaced ends; and,
    interfacing means for interfacing between said vacuum bar and the associated tire tread.

4. The system of claim 1 wherein said arm assembly comprises first and second arms and wherein said upper surface of said conveyor assembly has first and second side slots therein for passage of an end portion of each of said first and second arms from a position above said upper surface to a position below said upper surface.

5. The system of claim 4 wherein said arm assembly further comprises:
    second translating means for translating said first and second arms relative to said frame in said first plane.

6. The system of claim 4 wherein said arm assembly further comprises:
    a rod extending between said vertical members, said first arm positioned near a first end of said rod and said second arm positioned near a second end of said rod; and wherein said inverting means includes a first hydraulic actuator operable to rotate said rod about an axis thereof.

7. The system of claim 4 wherein said frame is positioned between the associated storage device and said conveying apparatus.

* * * * *